United States Patent
Konitzer

(10) Patent No.: US 10,814,428 B2
(45) Date of Patent: Oct. 27, 2020

(54) DIRECT PRINT ADDITIVE WALL

(71) Applicant: GENERAL ELECTRIC COMPANY, Schenectady, NY (US)

(72) Inventor: Douglas Gerard Konitzer, West Chester, OH (US)

(73) Assignee: General Electric Company, Schenectady, NY (US)

( * ) Notice: Subject to any disclaimer, the term of this patent is extended or adjusted under 35 U.S.C. 154(b) by 303 days.

(21) Appl. No.: 15/867,327

(22) Filed: Jan. 10, 2018

(65) Prior Publication Data

US 2019/0210152 A1    Jul. 11, 2019

(51) Int. Cl.
| | |
|---|---|
| *B23K 26/342* | (2014.01) |
| *B33Y 10/00* | (2015.01) |
| *B33Y 30/00* | (2015.01) |
| *B23K 26/00* | (2014.01) |
| *B23K 15/00* | (2006.01) |
| *B23K 26/082* | (2014.01) |

(52) U.S. Cl.
CPC ........ *B23K 26/342* (2015.10); *B23K 15/0026* (2013.01); *B23K 15/0046* (2013.01); *B23K 26/0093* (2013.01); *B23K 26/082* (2015.10); *B33Y 10/00* (2014.12); *B33Y 30/00* (2014.12)

(58) Field of Classification Search
CPC .................................................... B23K 26/342
USPC ......................................... 219/76.1, 71–107
See application file for complete search history.

(56) References Cited

U.S. PATENT DOCUMENTS

| | | |
|---|---|---|
| 4,886,108 A | 12/1989 | Utsunomiya et al. |
| 6,710,296 B2 | 3/2004 | Siedal |
| 7,073,561 B1 | 7/2006 | Henn |
| 8,178,033 B2 | 5/2012 | Dietrich et al. |
| 8,598,523 B2 | 12/2013 | Stecker et al. |
| 9,050,674 B2 | 6/2015 | Sumner |
| 9,399,264 B2 | 7/2016 | Stecker |
| 9,481,931 B2 | 11/2016 | Stempfer |
| 2014/0027414 A1 | 1/2014 | Lin et al. |
| 2017/0066196 A1 | 3/2017 | Beard et al. |

*Primary Examiner* — Lori L Baker
(74) *Attorney, Agent, or Firm* — Dinsmore & Shohl LLP

(57) ABSTRACT

A method for producing a layered object includes irradiating a surface layer of the object with an energy beam to create an interaction zone on the surface layer. The method also includes providing relative motion between the energy beam and the surface layer so as to control the interaction between the energy beam and the surface layer. The method also includes introducing feedstock into the interaction zone so that the feedstock melts and forms a hot solidified surface after leaving the interaction zone. The method also includes applying mechanical energy to the hot solidified surface.

13 Claims, 5 Drawing Sheets

DIRECT PRINT ADDITIVE WALL

INTRODUCTION

The present disclosure generally relates to a method and apparatus adapted to perform additive manufacturing ("AM") processes. More specifically, the present disclosure relates to a method and apparatus for providing mechanical work near the solidification of additive material to smooth the surface thereof.

BACKGROUND

Generally, a Directed Energy Deposition (DED) machine consists of a nozzle mounted on a multi axis arm which deposits melted material onto the specified surface where it solidifies. The process is similar in principle to material extrusion but the nozzle can move in multiple directions and is not fixed to a specific axis. The DED machine utilizes focused energy (either an electron beam or laser beam) to fuse materials by melting as the material is being deposited. The process can be used with polymers and ceramics but is typically used with metals in the form of either powder or wire. Metals such as cobalt chrome and titanium are used. Wire is less accurate due to the nature of a pre-formed shape but is more material efficient when compared to powder. The method of material melting varies between a laser, an electron beam or plasma arc, all within a controlled chamber where the atmosphere has reduced oxygen levels.

Powder-fed systems, such as Laser Metal Deposition (LMD) and Laser Engineered Net Shaping (LENS), blow powder through a nozzle, which is melted by a laser beam on the surface of the part. Laser-based wire feed systems, such as Laser Metal Deposition-wire (LMD-w), feed wire through a nozzle that is melted by a laser, which incorporates inert gas shielding in either an open environment (gas surrounding the laser), or in a sealed gas enclosure or chamber. This process provides higher deposition rates as compared with powder bed and blown powder DED.

Referring to FIG. 1, a conventional electron beam additive process utilizes wire feedstock from a wire feeder 12 and an electron beam heat source 16 from an electronic beam gun 14 to produce a near-net shape part. The wire feeder 12 deposits a molten alloy metal material 18 onto a substrate 20 layer by layer until the part 10 reaches near-net shape.

Once the part 10 reaches near-net shape, it undergoes a finish heat treatment and machining.

Direct print additive manufacturing, with either a powder spray or wire feed, usually results in an as-cast surface with no mechanical work in the material. That is, the additive material has no mechanical work and a rough surface. Thus, there exists a need to smooth the surface and provide the mechanical work.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

The foregoing and/or aspects of the present invention may also be achieved by a method of fabricating an object. The method may include a) irradiating a given surface layer of the object with an energy beam to create an interaction zone on the surface layer; b) providing relative motion between the energy beam and the given surface layer so as to control the interaction between the energy beam and the given surface layer; c) introducing feedstock into the interaction zone so that the feedstock melts and forms a hot solidified surface after leaving the interaction zone; d) applying mechanical energy to the hot solidified surface; and e) repeating steps (a) through (d) to form at least part of the layered object.

The foregoing and/or aspects of the present invention may also be achieved by an apparatus for producing a layered object. The apparatus may include an irradiation source for irradiating a given surface layer of the object with an energy beam to create an interaction zone on the surface layer, a stage for providing relative motion between the energy beam and the given surface layer so as to control the interaction between the energy beam and the given surface layer, a feedstock source for directing feedstock into the interaction zone so that the feedstock melts and forms a hot solidified surface after leaving the interaction zone, and a roller for applying mechanical energy to the hot solidified surface.

Other features and aspects may be apparent from the following detailed description, drawing and claims.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present disclosure relates to a method of fabricating an object. In one implementation, a surface layer of the object may be irradiated with an energy beam provided by a laser or electric beam gun. A wire feeder may be provided to introduce feedstock such as, for example, a metal material into an interaction zone on top of the surface layer of the object so that the feedstock melts and forms a hot solidified surface after leaving the interaction zone. In this implementation, a mechanical device, such as a roller, for example, may be provided to apply a mechanical energy to the hot solidified surface of the object before the hot solidified surface of the object cools. According to this example implementation, this process may be repeated until at least part of the layered object is built.

Figure 1:
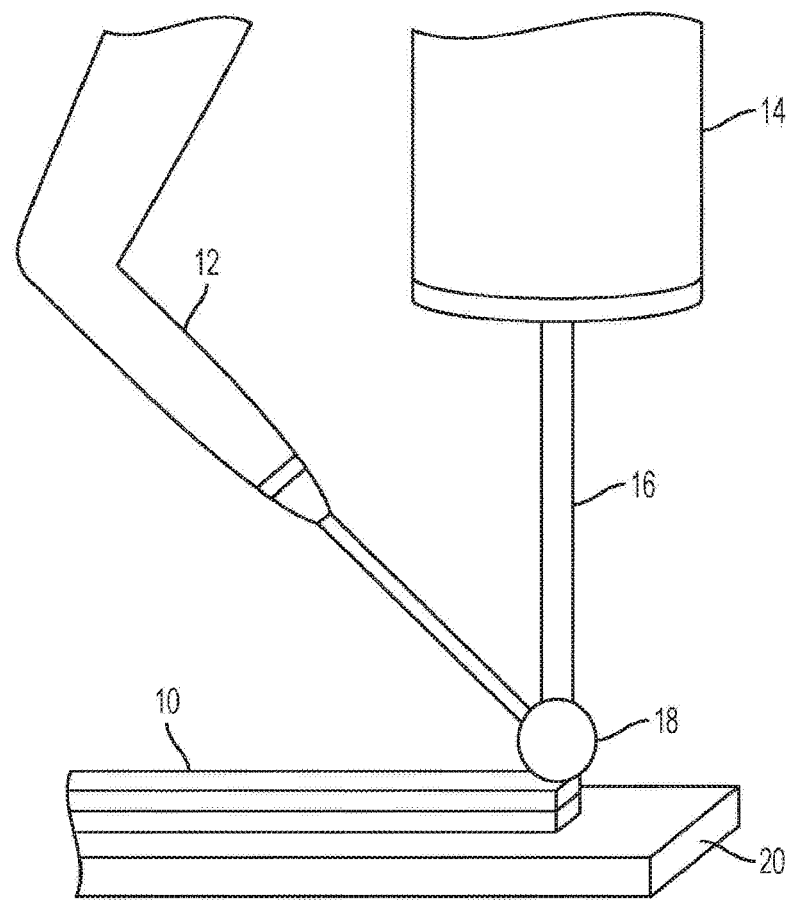
FIG. 1 is a diagram of a side view of a conventional additive manufacturing apparatus for building an object.
Figure 2:
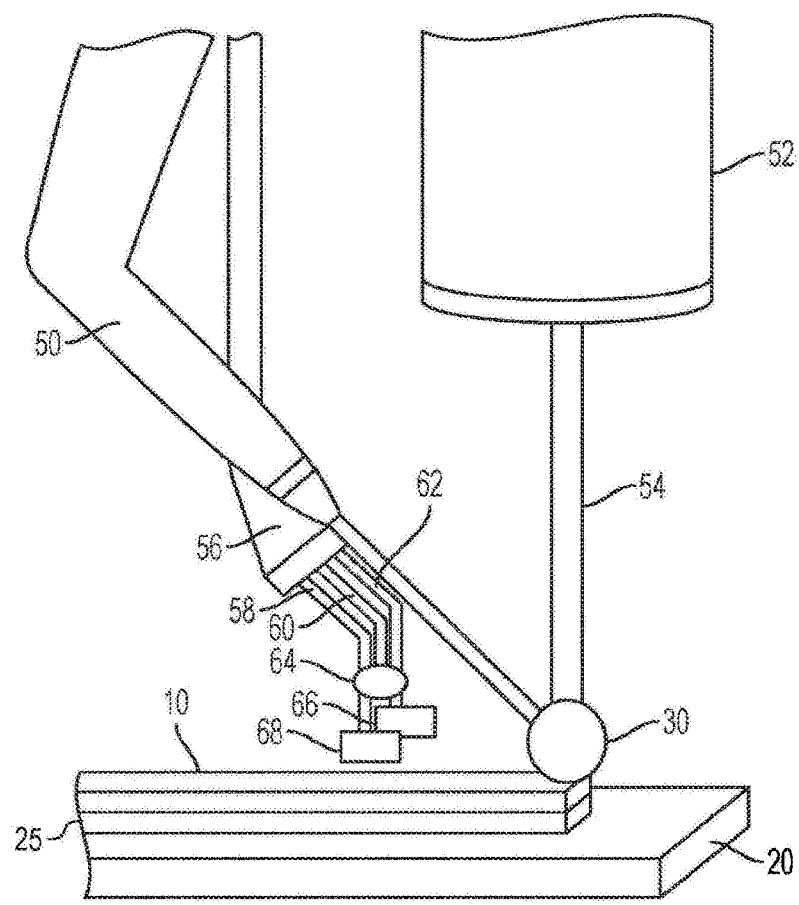
FIG. 2. is a diagram of a side view of a wire fed additive manufacturing apparatus for building an object with mechanical rollers to hot work and smooth the surface of the object, according an implementation of the present invention.

Referring to FIG. 2, one implementation of an apparatus of the present invention, for example, a wire fed additive manufacturing apparatus, may include a laser or an electric beam source 52 to emit a laser or electric beam 54 onto a surface layer of an object 30 to be built on a substrate 22. The beam 54 utilizes focused energy to fuse materials by melting as the material is being deposited. The method of material melting may vary, for example, between a laser, an electron beam or plasma arc, all within a controlled chamber where the atmosphere has reduced oxygen levels. The object 30 being built on the substrate 22 may be a molten alloy metal material such as, for example, titanium, copper, or cobalt chrome. The apparatus may also be configured with a positioning device such as, for example, a stage (not shown) to provide a relative motion between the beam 54 and the surface layer of the object 30 to control an interaction between the beam 54 and the surface layer of the object 30. The apparatus may also include wire feeder 50 to direct feedstock such as, for example, a metal material into an interaction zone on top of the surface layer of the object 30 so that the feedstock melts and forms a hot solidified surface producing a solidified object after leaving the interaction zone. Either the wire fed apparatus, the substrate 22, or both may be lowered and/or moved to melt the metal (e.g., wire) from the wire feeder 50 on any portion of the substrate 22 and/or on previously solidified object 30 until the object 30 is completely built up from a plurality deposited layers 25. According to an example implementation, the apparatus may include a roller arm holder 56 having roller arms 58, 60, and 62 with respective rollers 64, 66, and 68 at an end thereof to apply a mechanical energy to the hot solidified surface of the object 30 to hot work the object 30. This mechanical hot work may be capable of hot working the hot solidified surface of the object 30 to produce a smooth surface of the object 30. The hot working the hot solidified surface of the object 30 may be achieved by hot working such as, but not limited to, rolling, forging, extrusion, and drawing. It may be appreciated by persons skilled in the art that hot working process metals, for example, are plastically deformed above their recrystallization temperature to allow the material to recrystallized during deformation. As such, the recrystallization keeps the material from strain hardening, which ultimately keeps the yield strength and hardness low and ductility high. According to the example implementation, applying the mechanical energy to the hot solidified surface 30 of the object 30 may be repeated until at least part of the layered object 30 is built.

Figure 3:
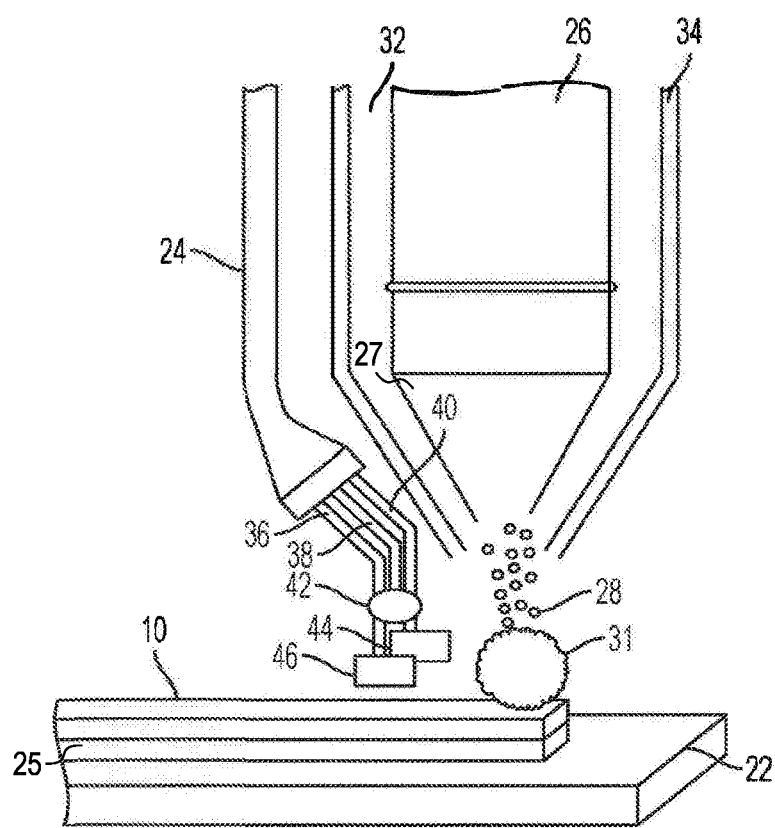
FIG. 3 is a diagram of a side view of a powder fed additive manufacturing apparatus for building an object with mechanical rollers to hot work and smooth the surface of the object, according an implementation of the present invention.

Referring to FIG. 3, another implementation of the apparatus of the present invention, for example, a powder fed additive manufacturing apparatus, may include a powder source 26 for dispensing powder 28 through a nozzle 27. The powder 28 may be fed along with shield gas through a shield gas source (32, 34). As the powder 28 is fed onto the substrate 22, the powder 28 may be melted or sintered into a melted powder material to form object 31 from an energy source (not shown) configured with the powder source 26. The energy source may be, for example, an electronic beam or electromagnetic radiation such as a laser beam. The object 31 being built on the substrate 22 may be a molten allow metal material such as, for example, titanium, copper, or cobalt chrome. As mentioned above, in this implementation, the apparatus may also be configured with a positioning device such as, for example, a stage (not shown) to provide a relative motion between the energy source configured with the powder source 26 and a surface layer of the object 31 to control an interaction between the energy source and the surface layer of the object 31. The powder 28 fed through the nozzle 27 may be provided on an interaction zone on top of the surface layer of the object 31 to be melted and form a hot solidified surface producing a solidified object after leaving the interaction zone. Either the powder fed apparatus, the substrate 22, or both may be lowered and/or moved to melt the metal material provided by the powder source 26 on any portion of the substrate 22 and/or on previously solidified object 31 until the object 31 is completely built up from a plurality deposited layers 25. According to an example implementation, the apparatus may include a roller arm holder 24 having roller arms 36, 38, and 40 with respective rollers 42, 44, and 46 at an end thereof to apply a mechanical energy to the hot solidified surface of the object 31 to hot work the object 31. This mechanical work may be provided to the hot solidified surface of the object 31 to produce a smooth surface of the object 31 cools. The process may be repeated until at least part of the layered object 31 is built.

Figure 4:
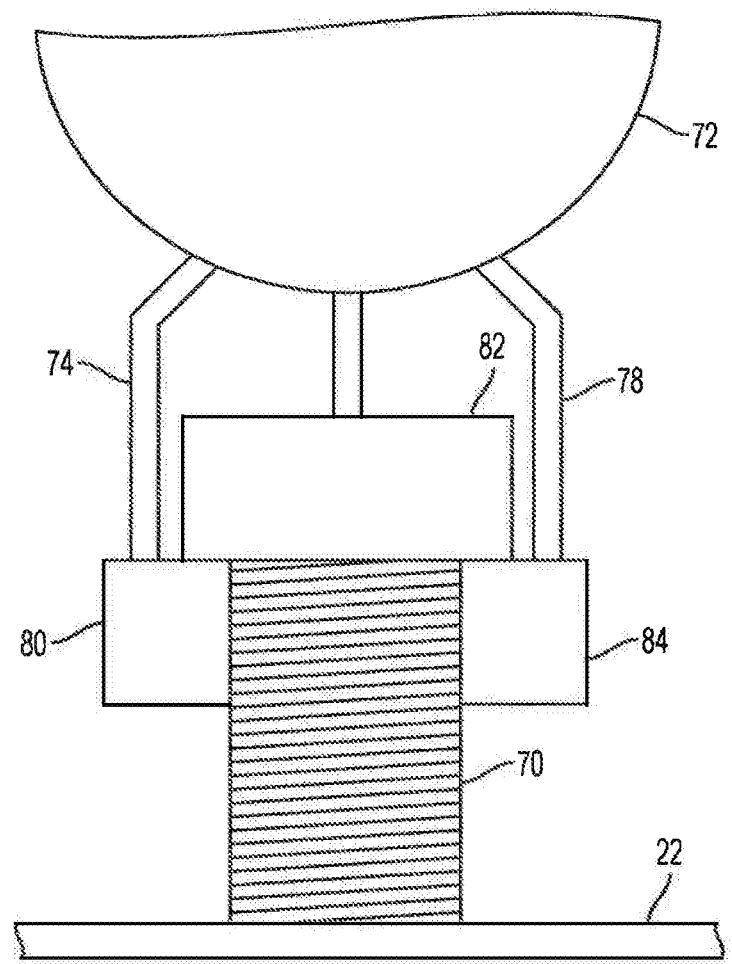
FIG. 4 is a perspective view illustrating at least three rollers providing mechanical work to an object being built layer by layer, according to an implementation.
Figure 5:
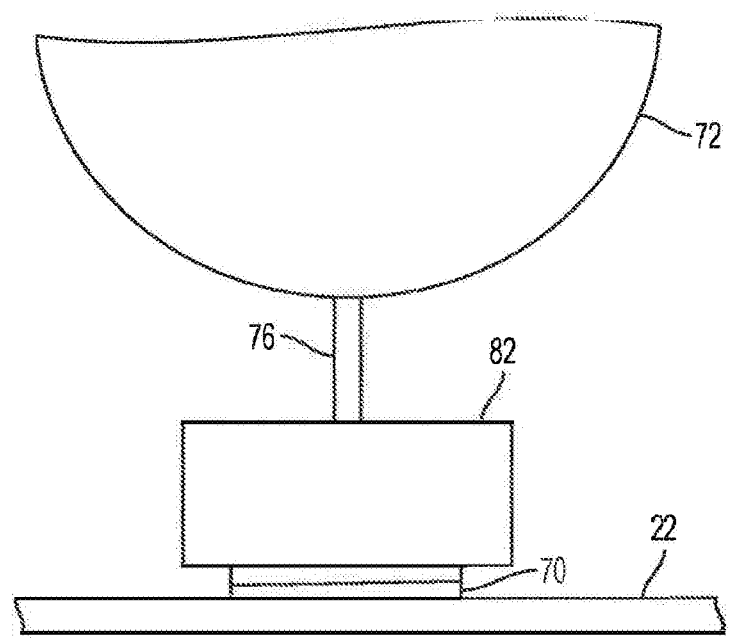
FIG. 5 is a perspective view illustrating a top roller providing mechanical work to an object at the beginning of the deformation process, according to an implementation.

Referring to FIG. 4, an example implementation of rollers to provide mechanical work near the solidified object, while the metal material is hot, is illustrated. While the example implementation describes rollers to provide the mechanical work, the present invention is not limited thereto and may provide other mechanical devices to provide mechanical work such as, for example, a skid or a rotational friction stir tool. According to the example implementation, by provided rollers to hot work the object, the metal material may be recrystallized with little energy due to the relative weakness of the material. In this implementation, a roller arm holder 72 may include at least three roller arms 74, 76, and 78, each configured with respective rollers 80, 82, and 84 at an end thereof to hot work object 70. For example, as the object 70 is built layer by layer on the substrate 22, the rollers 80, 82, and 84 may provide deformation to the top and sides of the object 70 to provide a smooth surface on the object 70 allowing for a better microstructure of the object with improved material properties. Referring to FIG. 5, it may be appreciated by persons skill in the art that a single roller 82 may be used at the beginning of the deformation process to deform and smooth a top portion of the object 70 due to a small number of stacked layers of the object 70.

In accordance with the above-described implementations, the present invention may be capable of providing mechanical property improvements which can lead to better, more cost effective materials. The present invention allows for both machine improvement and wider applicability of additive manufacturing processing.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

What is claimed is:

1. A method for producing an object comprising the steps of:
   irradiating a surface layer of the object with an energy beam;
   feeding material onto the surface layer with a material source, wherein the material interacts with the energy beam and melts and forms a hot solidified surface; and
   hot working the hot solidified surface with a plurality of rollers disposed on a roller arm holder.

2. The method of claim 1, wherein the energy beam is a laser.

3. The method of claim 1, wherein the energy beam is an e-beam.

4. The method of claim 1, wherein the energy beam is a plasma beam.

5. The method of claim 1, wherein the material is metal powder.

6. The method of claim 1, wherein the material is metal wire.

7. An apparatus for producing a layered object comprising:
   an irradiation source for irradiating a surface layer of the object with an energy beam;
   a material source configured to direct material onto the surface layer that interacts with the energy beam and forms a hot solidified surface; and
   a roller arm holder having a plurality of rollers attached thereto, wherein the plurality of rollers are configured to hot work the hot solidified surface to produce a smoothened hot solidified surface.

8. The apparatus of claim 7, wherein the energy beam is a laser.

9. The apparatus of claim 7, wherein the energy beam is an e-beam.

10. The apparatus of claim 7, wherein the energy beam is a plasma beam.

11. The apparatus of claim 7, wherein the material is metal powder.

12. The apparatus of claim 7, wherein the material is metal wire.

13. The method of claim 1, further comprising repeating the irradiating, feeding, and hot working steps to form at least part of the object.

* * * * *